United States Patent [19]

McCandless

[11] Patent Number: 4,753,414

[45] Date of Patent: Jun. 28, 1988

[54] CARBON COATINGS IN REPLICATED OPTICS ART

[75] Inventor: James A. McCandless, Milford, Mass.

[73] Assignee: Balzers Optical Corporation, Marlborough, Mass.

[21] Appl. No.: 851,775

[22] Filed: Apr. 14, 1986

[51] Int. Cl.$^4$ .............................................. B29D 11/00
[52] U.S. Cl. .................................... 249/115; 156/233; 156/237; 156/239; 156/241; 249/114 G; 249/134; 264/1.3; 264/1.9; 264/2.5; 264/338; 427/34; 427/39; 425/808
[58] Field of Search ................... 264/1.9, 2.5, 1.3, 338; 427/34, 39, 162, 165, 166; 249/114, 115, 134; 425/808; 156/233, 237, 239, 241

[56] References Cited

U.S. PATENT DOCUMENTS

| | | | |
|---|---|---|---|
| 3,235,630 | 2/1966 | Doherty et al. | 264/2.5 |
| 4,060,660 | 11/1977 | Carlson | 428/408 |
| 4,319,945 | 3/1982 | Howden | 264/1.7 |
| 4,330,183 | 5/1982 | Kastner | 350/609 |
| 4,383,728 | 5/1983 | Litington | 350/1.6 |
| 4,400,410 | 8/1983 | Green et al. | 427/39 |
| 4,482,511 | 11/1984 | Komatsubara | 264/1.3 |
| 4,657,354 | 4/1987 | Kobayashi | 264/1.7 |
| 4,661,409 | 4/1987 | Kieser et al. | 428/408 |

FOREIGN PATENT DOCUMENTS 1582231  1/1981  United Kingdom .

OTHER PUBLICATIONS

Knut Enke, "Hard Carbon Layers for Wear Protection & Antireflection Purposes of Infrared Devices", Applied Optics, vol. 24, No. 4, 2-15-85, pp. 508-512.
Concise Encyclopedia of Chemical Technology Kirk-Othmar p. 207.
Lebow, "Thin Film Databook 1979, p. 2, J. Voc. Science Technology, Vo. Mar. 1982.
T. J. Maravee, "The Development of Diamond-like (i-carbon) Thin Films as Antireflecting Coatings for Silicon Sila Cells.

*Primary Examiner*—James Lowe
*Attorney, Agent, or Firm*—Andrew F. Kehoe

[57] ABSTRACT

An improved procedure for manufacture of optical replication products comprising the use of a thin amorphous coating of carbon as a protective coating which also facilitates release during replication, between master and replication members. Particular attention is given to controlling the compressive forces of the carbon layer to provide good mechanical coatings on suitable optical surfaces. Thereafter, the replicated members may themselves be coated with the carbon as a protective coating only or for further use as a release-promoting "submasters".

5 Claims, 1 Drawing Sheet

CARBON COATINGS IN REPLICATED OPTICS ART

BACKGROUND OF THE INVENTION

This invention relates to the field of replicated optics. In particular, the invention teaches how hard amorphous carbon coatings can be used to facilitate manufacture of replicated optical products in addition to providing products of superior durability.

Replicated optics are a known field of art. Various aspects and approaches to the field are described in U.S. Pat. Nos. 2,464,736 to White et al; 3,873,191 to Veret et al; 4,255,364 to Talbert and 4,453,587 to Gowan.

In general, a master optical article is provided to very close optical thickness, often to a surface smoothness of ¼-wavelength of light. This master, usually formed of glass or other dimensionally-stable material, is coated with a release-facilitating layer (usually called merely a "release layer") then, usually, with a protective layer and, finally, a vacuum-deposited mirror-like, finish layer. The idea is to prepare a master from which one can transfer the reflective layer with the master's surface quality to a wholly different substrate article, thereby forming a replicated optical article. The surface of the substrate is often within about 0.0002-inch root mean square of the surface smoothness of the master.

This transfer is usually carried out by use of an adhesive based on organic resins such as epoxy or polyester resins. The adhesive, after appropriate mixing and deaereating, is poured onto the master or the substrate. Then the master is mated to the substrate with the excess resin being squeezed out around the periphery of the mated articles. When the resin is cured, the master can be separated away from the rest of the assembly at the release layer. The substrate now carries the reflective surface and is then defined as the "replicated optical" article. The replicated article is sometimes itself used as a "submaster" to create still another replicated optical article.

This process has been commercially successful, but as demand grows for improved products and higher yields of products, it has been desirable to seek new and improved ways to improve the process.

Other art, heretofore unrelated, to the art of optical replication, is that describing the formation of thin carbon coatings as infra-red reflective wear layers. See United Kingdom Pat. No. 1,582,231. Other publications relating to carbon coatings include U.S. Pat. No. 4,383,728 to Litington describing infra-red reflective surfaces, an article by Enke in Applied Optics/Volume 24, No. 4 of Feb. 15, 1985, and an article by Moravec and Lee in the Journal of Vacuum Sci. Technology of March 1982 following the terminology of Moravec and Lee, these carbons are known in the art as i-carbons.

The above assembly of prior art was necessarily made with full knowledge of the invention to be described below. It is emphasized that nowhere in the prior art was the technology of carbon coatings related to achieving any specific advantage in the field of replicated optics.

SUMMARY OF THE INVENTION

A principal object of the invention is to provide masters and replicated optical products having superior wear surfaces and wear surfaces which improve release characteristics during replication processes.

Another object of the invention is to provide amorphous carbon wear surfaces having the aforesaid improved wear and release characteristics.

A further object of the invention is to provide a process whereby compressive stresses of a amorphous carbon surface are carefully controlled to preserve, and even enhance, the optical properties of optical masters and the replicated optical products.

Other objects will be obvious to those skilled in the art on their reading of this disclosure.

The above objects have been substantially achieved by the provision of an improved surface for use with replicated optics, one formed of amorphous carbon and which also serves as an excellent wear surface for protecting the various critical surfaces used in the replicated optics art.

In one aspect of the invention, the discovery of the beneficial release properties of the i-carbon coating allows an easier, more dependable release of a replicated optical article from, say, a master. Amorphous carbon coatings have been known for their wear-resistant properties. However, they are even more notorious for the extraordinary compressive-forces which they generate—often a magnitude or more greater than commonly-coated inorganic material. Thus, no matter how beneficial the other properties of a carbon coating may be, they are of little consequence unless the extraordinary compressive stresses of amorphous carbon can be controlled to avoid its tendency to pull away from the underlying surface and also to avoid the mechanical distortion of the optical surface, to which the carbon coating is well adhered.

The Inventor has addressed this problem and found that by careful control of both carbon-deposition kinetics and the thickness of the carbon layer, the compressive stress of the carbon coating can be reduced to a tolerable level, i.e., one at which it neither substantially degrades the optical properties of the optical surfaces on which it is coated nor cracks and pulls away from the coated surface.

Nevertheless, in some circumstances, the compressive stress remains formidable. This property can be used to correct replicated surfaces which have been somewhat deformed by tensile stress during replication.

In short, not only has the inventor provided a new and improved release coating for use in replicated optics, but he has "tamed" the extraordinary compression characteristics of this amorphous-carbon release coat by a careful combination of thickness and morphology of the coating and has facilitated the production of the suitable morphology by careful control of the coating deposition process.

In this application there is described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

DESCRIPTION OF THE PREFERRED EMBODIMENTS

Figure 1:
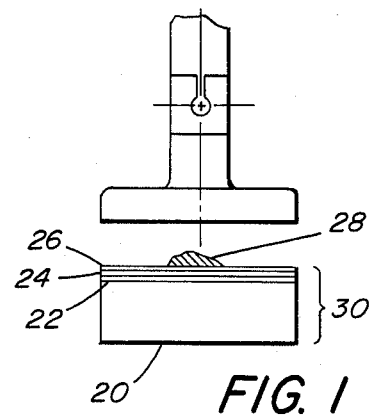
FIG. 1 is a schematic diagram of the elements used in a typical replicated optics procedure of the invention.

In order to assure production of a suitable submaster one should pay particular attention to the procedure by which it has been prepared.

Thus, a glass master 20 (which may also be protected with a carbon coating, but which need not be so described for the purpose of this example) is coated with a thin layer of a release agent 22 formed of a thin layer of gold (about 500 angstroms thick). Next a thin (about 400 angstroms thick) layer 24 of silicon is deposited on the gold to serve as a layer having enhanced carbon affinity. Germanium and a number of other materials could also be used for this purpose. A relatively thick layer 26 of aluminum (about 10,000 angstroms thick) is then deposited on the silicon. This aluminum layer serves as a means to provide protection from ion bombardment and heating during the subsequent deposition of carbon as seen at 40. In most preparations of submasters, it will not serve as a mirror finish.

It should be noted that one can deposit the aluminum using a pulsed gas process (PGP) as described by Springer et al in the January/February 1980 issue of Journal of Vacuum Science Technology in the article "Quantitative Characterization of High Strength Aluminum Foils Deposited on Curved Surfaces". In general, the aluminum deposition by this method includes intermittent admission of oxygen to the coating chamber and results in the "aluminum layer" comprising a number of zones high in aluminum oxide content. Such a procedure helps to minimize the grainy nature of aluminum coatings which tend to take place with increased thickness. (It should be noted, however, that there have been indications that the carbon coating itself plays a very beneficial role in smoothing the graininess of an aluminum undercoat, particularly when layers appproach 0.1 micrometers in thickness.)

With the placement of the aluminum layer 26 on the master, the master contains all of the layers required for transfer to another substrate to form a "replicated master" or "submaster".

Figure 2:
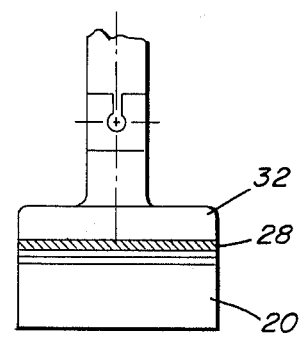
FIG. 2 shows the elements of FIG. 1 pressed to mate the master with the substrate to which an optical surface is to be transferred.
Figure 3:
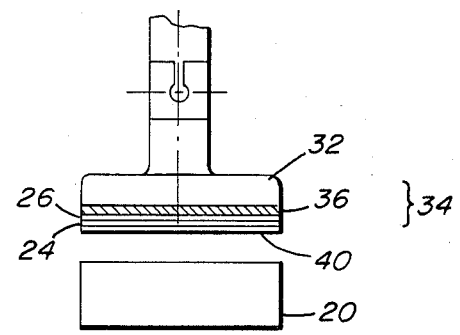
FIG. 3 shows the elements of FIGS. 1 and 2 after the separation.

At this point, a high-temperature transfer adhesive 28, e.g., an epoxy resin system having a glass transition temperature of above 120° C. and preferably about 150° C., is applied to the coated master 30 and a substrate 32 (as seen in FIG. 2) is pressed against the master all according to the techniques known in the art of replicated optics, and then cured and withdrawn, as seen in FIG. 3, to leave a replicated "submaster" 34 with the layer 24, that having good affinity to carbon in the outermost position. The residual epoxy layer 36 is about 0.002 inch.

It is this submaster 34 that is carefully removed and mounted in the carbon coating apparatus for the controlled addition of the carbon layer.

The carbon coating process can be carried out according to general procedures known in the amorphous carbon coating art. See for example, British Pat. Spec. No. 1,582,231, Arthur Holland, inventor.

However, a number of important constraints are advantageously placed upon the process of achieving a coating of carbon which is suitable for the replicated optics art:

1. The total plasma glow time should be as short as possible. This objective is facilitated by use of a short Argon etching step;
    relatively fast gas flow rates, particularly of the carbon-bearing gas; and
    rapid transition of gas-to-gas as required during the process without any interruption in glow time. The objective of a short glow time is to facilitate minimize thermal damage to the replicated optic. This is most important when coating a replicated optical article, for example, one having an adhesive layer forms organic resin-like epoxy.
2. The object to be coated should be fitted snugly into its fixture in the processing equipment. Clearance of 0.015 inch are suggested, and the tooling edges should be just superflush with respect to the edges of the surface to be coated (say, about 0.02 inches). The supporting electrode is advantageous of high thermal conductivity material such as copper, and cooled when the size of the object to be coated warrants cooling.
3. It is desirable to achieve the best possible coating hardness that is compatible with acceptable compression stress. In terms of the British Patent, it is found that the coating stresses can be minimized by a combination of high self (i.e., called "target bias" in British Pat. No. 1,582,231) bias (900 to 1300 volts), and keeping a minimum gas pressure (e.g., ethylene or butane at about 22 micrometers of mercury. A bias closer to about 900 volts, e.g., 900 to 1000 volts is preferred to minimize any damage to the surface being coating.
4. Even with all of the foregoing, the coating should be kept as thin as possible. In general, amorphous carbon-coatings of between 0.08 and 0.3 microns seem to be most advantageous in assuring substantial wear, and insufficient compressive forces to cause either peeling of the coating or warping of the coated surface. Thinner coatings are most appropriate on smaller replicated optical articles whether to be used directly or as submasters. Coatings of up to a micron are tolerable on larger masters.

Among the carbon-bearing gases which are suitably used in this work are ethylene, ethane, butane and acetylene.

In sum, the inventor has provided a coating that, in addition to more dependable release properties, is an excellent way to help protect expensive optical masters from chemical and mechanical damage which frequently occurs during handling, storage, and use. These master materials are usually dimensionally-stable materials such as glass or steel, often protected with ultra-thin coatings of, for example, an oxide like silica, aluminum oxide or the like.

Replicated optical articles, very delicate if not as expensive as are masters, are also advantageously protected by a carbon coat. When the replicated optic is itself used as a submaster in replication of still another replicated optical article, the release characteristics of the coating are again utilized. The life of the submaster is thereby extended by use of the coating and in cost-savings in making aspheric replicas are particularly attractive.

It should be noted that a particularly advantageous use of the invention is in the preparation and use of submasters having non-planar optical surfaces.

It is also to be understood that the following claims are intended to cover all of the generic and specific features of the invention herein described and all statements of the scope of the invention which might be said to fall therebetween.

What is claimed is:

1. A replicated optical submaster comprising a dimensionally-stable optical-quality substrate carrying thereon an aluminum layer bound to said substrate by an organic resin adhesive and, coated thereover, a protective coating of amorphous carbon of i-carbon type which forms means to enhance the release characteristics of said master in optical replication processes.

2. A replicated submaster as defined in claim 1 wherein said carbon coating is from about 0.08 to 0.30 micrometers in thickness.

3. A process for making replicated optical articles comprising the steps of;

(a) coating an optical master or submaster with an optical surface member suitable for transfer to a replicated optical article;

(b) coating the body of a substrate with an organic resin adhesive;

(c) transferring said optical member to said body of said substrate with said adhesive coating on said substrate, thereby forming a partially-complete replicated optical article whereon said optical surface member is exposed;

(d) thereupon, coating the resultant optical surface member, while it is attached to said partially-complete, replicated, optical article with i-carbon to form a completed replicated article having an i-carbon-protected surface; and (e) using said completed replicated article as a submaster to replicate further optical articles according to steps (a) through (c).

4. A process as in claim 3 comprising the step of coating i-carbon within a thickness of 0.08 to 0.3 micrometers and said thickness selected to avoid any substantial compressive distortion of said optical surface.

5. A process as defined in claim 3 wherein said resin is curable with a glass transition temperature of at least 140° C.

* * * * *

UNITED STATES PATENT AND TRADEMARK OFFICE
CERTIFICATE OF CORRECTION

PATENT NO. : 4,753,414
DATED : 28 June 1988
INVENTOR(S) : James A. McCandless

It is certified that error appears in the above—identified patent and that said Letters Patent is hereby corrected as shown below:

Column 1, Line 55    1982 following the terminology of Moravec and Lee, these carbons are known in the art as i-carbons.

should read

Column 1, Line 55    1982. Following the terminology of Moravec and Lee, these carbons are known in the art as i-carbons.

Signed and Sealed this

Twenty-seventh Day of September, 1988

Attest:

DONALD J. QUIGG

Attesting Officer            Commissioner of Patents and Trademarks